Patented Feb. 20, 1934

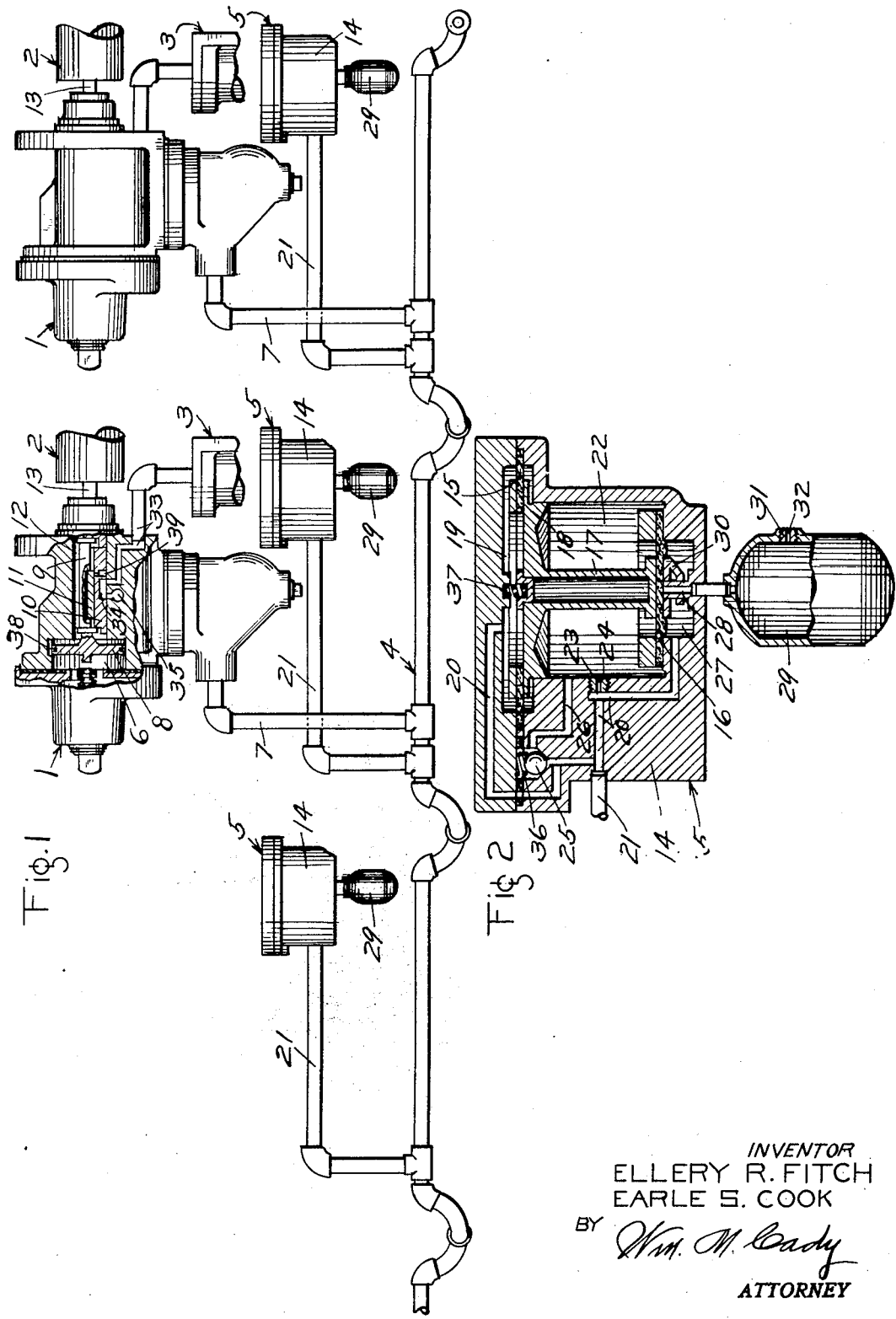

1,947,705

UNITED STATES PATENT OFFICE

1,947,705

FLUID PRESSURE BRAKE

Ellery R. Fitch, Edgewood, and Earle S. Cook, Wilkinsburg, Pa., assignors to The Westinghouse Air Brake Company, Wilmerding, Pa., a corporation of Pennsylvania Original application September 17, 1931, Serial No. 563,278. Divided and this application June 30, 1932. Serial No. 620,126

3 Claims. (Cl. 303—83)

This application is a division of our co-pending application, Serial No. 563,278, filed September 17, 1931, which relates to fluid pressure brakes and more particularly to an automatic fluid pressure brake system in which the brakes are applied by effecting a reduction in brake pipe pressure.

In the handling of long trains it is highly desirable to apply the brakes on cars at the rear end of the train as nearly as possible in synchronism with the application of the brakes on the cars at the head end of the train, so as to prevent the slack in the train from running in at such a rate as to cause excessive and damaging shocks.

As pointed out in our above identified co-pending application, in order to accomplish this result, we provide a fluid pressure brake system in which means is provided on the locomotive for effecting successive reductions in brake pipe pressure and in which sensitive and yet stable means is provided on the cars of the train which is responsive to each reduction in brake pipe pressure, effected through the operation of the means on the locomotive, for effecting corresponding successive limited local reductions in brake pipe pressure.

The present invention is principally concerned with the local venting of fluid under pressure from the brake pipe on the cars of the train and has for its principal object the provision of a sensitive and stable valve mechanism on each car of the train which is responsive to successive reductions in brake pipe pressure effected by either manually or automatically operated means on the locomotive for positively effecting corresponding successive limited local reductions in brake pipe pressure.

In the accompanying drawing; Fig. 1 is a diagrammatic view of a fluid pressure brake equipment for a train of cars and embodying our invention, a portion of the brake controlling valve device on one car being shown in section; and Fig. 2 is an enlarged sectional view of the quick service venting valve device employed on the cars of the train.

As shown in the drawing, the fluid pressure brake equipment on each car of the train may comprise a brake controlling valve device, such as a triple valve device 1, an auxiliary reservoir 2, a brake cylinder 3, a brake pipe 4 and a quick service brake pipe venting valve device 5.

The triple valve device 1 may be of any desired type, but for illustrative purposes only, a type has been shown in the drawing which is now in common use and which comprises a casing having a piston chamber 6 which is in communication with the brake pipe 4 in the usual manner by way of a branch pipe 7 and which contains a piston 8 having a stem 9 adapted to operate a main slide valve 10 and a graduating slide valve 11 contained in a valve chamber 12 which is connected to the auxiliary reservoir 2 in the usual manner by way of a pipe 13.

The triple valve device is operated in the usual manner upon a reduction in pressure in the brake pipe 4 to effect an application of the brakes and upon an increase in brake pipe pressure to effect the release of the brakes.

The quick service brake pipe venting valve device 5 is adapted to be operated upon a reduction in brake pipe pressure for effecting a local venting of fluid from the brake pipe. As shown in section, in Fig. 2 of the drawing, this valve device 5 may comprise a casing 14 in which is mounted flexible diaphragms 15 and 16 which are spaced apart and are connected together, to move in unison, by a hollow stem 17 carried by a follower 18 which is in operative engagement with the diaphragm 15. The diaphragm 15 is of greater area than the diaphragm 16.

At one side of the diaphragm 15 there is a chamber 19 which is connected to a passage 20 connected to a pipe 21 communicating with the brake pipe 4. The chamber 22 between the diaphragms 15 and 16 is also connected to passage 20 through a restricted port 23 in a choke plug 24, and passage 20 is further connected to chamber 22 by way of a check valve 25 and a by-pass passage 26. At the outer face of the diaphragm 16 there is a chamber 27 which is also connected to the passage 20.

The diaphragm 16 is adapted to engage a valve seat provided on a seat member 28 and controls communication from chamber 27 to a bulb or quick service reservoir 29. Carried by the diaphragm 16 is a guide member 30 which is guided on the seat member 28. The reservoir 29 is provided with a choke plug 31 having a restricted port 32, so that fluid can vent from the reservoir 29 at all times at a rate as determined by the flow area of the port 32.

In the drawing, the locomotive equipment has not been illustrated but it will be understood that this equipment may be substantially the same as that fully disclosed in our above identified co-pending application, in which successive reductions in brake pipe pressure are effected automatically or may be of a type in which the successive reductions in brake pipe pressure are controlled manually. In the following description of the operation of the equipment, it will be assumed, for the sake of clarity, that the locomotive equipment is the same as that disclosed in our said co-pending application.

In operation, when the brake valve device (not shown) is in running position, the brake pipe 4 is maintained charged with fluid at feed valve pressure in the manner described in our said co-pending application.

On each car of the train, the triple valve device 1 and auxiliary reservoir 2 are charged with fluid under pressure in the usual manner and, with the triple valve device in release position, as shown in Fig. 1, the brake cylinder is open to the atmosphere through a pipe and passage 33, a cavity 34 in the triple valve main slide valve 10, and the usual brake cylinder exhaust passage 35. The chamber 19 of the quick service valve device 5 is charged with fluid under pressure from the brake pipe 4 by way of pipe 21 and passage 20. The chamber 22 is charged with fluid under pressure through passage 20 and port 23 and also past the check valve 25 through passage 26. The flow of fluid past the check valve 25 does not occur, however, until the pressure of fluid in passage 20, acting below the check valve, slightly exceeds the fluid pressure in chamber 22, which acts above the check valve, plus the pressure of a coil spring 36 acting at all times to urge the check valve to its seat.

The by-pass charging passage 26 with the check valve 25 are provided so as to permit a more rapid build up of pressure in chamber 22, when the brake pipe pressure is increased to release the brakes, since recharge by way of the restricted port 23 would be so slow that particularly at the head end of the train, the brake pipe pressure would be increased in the chamber 19 so much more rapidly than in chamber 22, that there would be liability of damage or rupture of the diaphragm 15. At the same time, the flow from the brake pipe to the chamber 22 is somewhat retarded by the action of the spring weighted check valve 25, so that in releasing, the diaphragm 16 will be held seated by the higher pressure in chamber 19.

When the fluid pressures on the diaphragms 15 and 16 have substantially equalized, the diaphragms will be operated to maintain the diaphragm 16 seated against the seat member 28 by the pressure of a spring 37 which is interposed between the casing 14 and follower 18.

In order to effect a service application of the brakes, a series of successive light reductions in brake pipe pressure is effected by the operation of suitable means carried by the locomotive such for instance as the apparatus fully disclosed in our said co-pending application.

On the cars of the train, the initial reduction in brake pipe pressure produced by the apparatus on the locomotive, causes a corresponding reduction in fluid pressure in the chamber 19 of the vent valve device 5. Due to the check valve preventing back flow of fluid from the chamber 22 to the passage 20, the pressure of fluid in chamber 22 can only reduce by flow through the restricted port 23, so that the pressure in chamber 19 reduces at a greater rate than the pressure in chamber 22. A differential pressure is thus created on the diaphragm 15, which causes the upward movement of the diaphragms 15 and 16, so that the diaphragm 16 is moved from the seat member 28, permitting the flow of fluid from the brake pipe 4, through pipe 21, passage 20 and chamber 27 to the quick service reservoir 29.

A local venting of fluid from the brake pipe to the chamber 29 is thus produced which is effected serially on the cars of the train from the front to the rear.

Due to the relative areas of the diaphragms 15 and 16, the light weight of the parts, and the short movement required to unseat the diaphragm 16, the valve device 5 will operate when only a light differential of pressures has been created between the chambers 19 and 22, so that a local reduction in brake pipe pressure is produced very quickly in response to the reduction in brake pipe pressure.

On the other hand, by properly proportioning the flow area of the port 23, the valve device 5 can be made responsive to vent fluid under pressure from the brake pipe only when the rate of reduction in brake pipe pressure is such as to cause the necessary differential pressure to be created.

As a consequence, the valve device 5 is rendered stable in that it is not responsive to fluctuations in brake pipe pressure due to leakage from the brake pipe and slight variations in brake pipe pressure due to variations in the operation of the usual feed valve device. In other words, our vent valve device 5 is responsive and only responsive, when the reduction in brake pipe pressure is at a desired predetermined rate.

As soon as the rate of reduction in brake pipe pressure becomes less than the rate required to maintain the pressure differential necessary to hold the diaphragm 15 in its upper position, the spring 37 acts, through the medium of the follower 18, to move the diaphragms downwardly so that the diaphragm 16 engages the seat member 28 and as a consequence cuts off the further venting of fluid from the brake pipe.

The successive waves of reduction in brake pipe pressure as produced by the operation of the apparatus on the locomotive, causes corresponding successive operations of the quick service brake pipe vent valve device 5 so that a succession of local reductions in brake pipe pressure are produced on each car of the train.

When the diaphragm 16 seats on the seat member 28, the fluid in chamber 29 is vented to the atmosphere at a rate as permitted by the restricted port 32, so that the pressure in said chamber is reduced to provide for a further reduction in brake pipe pressure when the diaphragm 16 opens communication from the brake pipe to the chamber at each successive reduction in brake pipe pressure.

The volume of the chamber 29 is made such as to give the desired brake pipe reduction, taking into consideration the volume of the brake pipe on each car.

The flow capacity of the restricted passage 32 may be such as to provide a reduction of pressure in the reservoir 29 of about five to ten pounds between successive operations of the valve device 5.

In effecting an application of the brakes, the triple valve piston 8 moves outwardly from release position, in which it is shown in Fig. 1, to service position, first closing the usual feed groove 38 around the piston and shifting the graduating slide valve 11 relative to the main slide valve 12 to uncover the service port 39 in the main slide valve and then shifting the main slide valve to service position in which position fluid under pressure is supplied from the auxiliary reservoir 2 and connected valve chamber 12 through port 39 and passage and pipe 33 to the brake cylinder 3.

By providing a quick service vent valve device on cars of the train which responds quickly to each of a series of successive light reductions in brake pipe pressure at a predetermined rate to effect a light predetermined local reduction in brake pipe pressure, the transmission time from the front to the rear of the train is greatly reduced as compared with previous equipments, so that the brakes on the cars at the rear end of the train are applied more nearly in synchronism with the brakes on cars at the head end of the train, and by providing means on the locomotive for either automatically or manually effecting successive predetermined reductions in brake pipe pressure, the brake pipe pressure can be reduced throughout the train to any desired degree, so as to produce the desired brake application.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a valve device for venting fluid under pressure from the brake pipe of a fluid pressure brake equipment, said valve device comprising a casing, two pressure chambers in constant communication with the brake pipe and normally charged with fluid under pressure from the brake pipe, a movable abutment separating said chambers and subject on opposite sides to the pressures of fluid in said chambers, valve means operable by said abutment upon a reduction in the pressure of fluid in one of said chambers for establishing a communication through which fluid under pressure is locally vented from the brake pipe and operable by said abutment to close off the local flow of fluid from the brake pipe upon the substantial equalization of fluid pressures in said chambers, means for retarding the rate of reduction in the other of said chambers and for restricting the flow of fluid thereto when fluid is being supplied from the brake pipe, and means operable upon the creation of a predetermined pressure differential between said chambers to increase the rate of recharge of said other chamber when fluid is being supplied from the brake pipe.

2. In a valve device for venting fluid under pressure from the brake pipe of a fluid pressure brake equipment, said valve device comprising a casing, two pressure chambers in constant communication with the brake pipe and normally charged with fluid under pressure from the brake pipe, a movable abutment separating said chambers and subject on opposite sides to the pressures of fluid in said chambers, valve means operable by said abutment upon a reduction in the pressure of fluid in one of said chambers for establishing a communication through which fluid under pressure is locally vented from the brake pipe and operable by said abutment to close off the local flow of fluid from the brake pipe upon the substantial equalization of fluid pressures in said chambers, means for retarding the rate of reduction in the other of said chambers and for restricting the flow of fluid thereto when fluid is being supplied from the brake pipe, and a valve operable upon an increase in brake pipe pressure to a predetermined degree higher than the pressure in said other chamber for establishing a communication through which fluid flows to said other chamber at a rate substantially equal to the rate of flow of fluid to the first mentioned chamber.

3. In a valve device for venting fluid under pressure from the brake pipe of a fluid pressure brake equipment, said valve device comprising a casing, two pressure chambers in constant communication with the brake pipe and normally charged with fluid under pressure from the brake pipe, a movable abutment separating said chambers and subject on opposite sides to the pressures of fluid in said chambers, valve means operable by said abutment upon a reduction in the pressure of fluid in one of said chambers for establishing a communication through which fluid under pressure is locally vented from the brake pipe and operable by said abutment to close off the local flow of fluid from the brake pipe upon the substantial equalization of fluid pressures in said chambers, means for retarding the rate of reduction in the other of said chambers and for restricting the flow of fluid thereto when fluid is being supplied from the brake pipe, and a valve operable upon an increase in brake pipe pressure to a predetermined degree higher than the pressure in said other chamber for establishing a communication through which fluid flows to said other chamber at a rate substantially equal to the rate of flow of fluid to the first mentioned chamber, said valve being adapted to prevent back flow of fluid from said other chamber when the pressure of fluid in the first mentioned chamber is being reduced.

ELLERY R. FITCH.
EARLE S. COOK.